United States Patent

[11] 3,597,824

[72] Inventors Takekazu Yoshida
Fujiidera-shi;
Yoshinobu Maeda, Kitakawachi-gun,
Osaka; Kazufumi Isomichi, Moriguchi-shi,
all of, Japan
[21] Appl. No. 847,329
[22] Filed Aug. 4, 1969
[45] Patented Aug. 10, 1971
[73] Assignee Matsushita Electric Industrial Co., Ltd.
Osaka, Japan
[32] Priority Aug. 10, 1968, May 9, 1969, Aug. 10, 1968, Mar. 19, 1969
[33] Japan
[31] 43/56791, 44/36841, 43/68842 and 44/24743

[54] FULL-AUTOMATIC ELECTRIC PART MOUNTING APPARATUS
8 Claims, 25 Drawing Figs.

[52] U.S. Cl. .......... 29/203, 29/211
[51] Int. Cl. .......... H01r, B23q 7/10
[50] Field of Search .......... 29/203 R, 203 B, 211

[56] References Cited
UNITED STATES PATENTS

| | | | |
|---|---|---|---|
| 3,034,382 | 5/1962 | Hazel | 29/203 B |
| 3,134,167 | 5/1964 | Diekhoff | 29/203 B |
| 3,141,492 | 7/1964 | Petree et al. | 29/203 B |
| 3,439,520 | 4/1969 | Schwartz | 29/203 B X |
| 3,475,805 | 11/1969 | Rottmann | 29/203 B |
| 3,499,220 | 3/1970 | Hintz et al. | 29/203 B X |
| 3,499,204 | 3/1970 | Drop | 29/203 B |

*Primary Examiner*—Harrison L. Hinson
*Attorney*—Stevens, Davis, Miller & Mosher

ABSTRACT: An apparatus for mounting electric parts, each having leads extending axially from the opposite ends thereof, on a printed substrate, by which the steps of chopping the leads, shaping the chopped leads, and inserting and fixing the shaped leads in the corresponding holes in said printed substrate are carried out automatically continuously.

T. YOSHIDA,
Y. MAEDA, &
K. ISOMICHI
INVENTORS

BY Stevens, Davis, Miller & Mosher ATTORNEYS

FULL-AUTOMATIC ELECTRIC PART MOUNTING APPARATUS

The present invention relates to an apparatus which is adapted for use primarily in assembling an electric circuit comprising electric parts, such as resistor elements and capacitor elements, having leads extending axially from the opposite ends thereof, and by which the steps of chopping the leads, shaping the chopped leads and inserting the shaped leads into the corresponding holes in a printed substrate are carried out automatically.

As an apparatus for automatically mounting electric parts, having leads extending axially from the opposite ends thereof, on a printed substrate, there has been used one which is adapted for mounting the same kind of electric parts on a printed substrate, or one which is adapted for mounting on a printed substrate a plurality of kinds of electric parts previously arranged in the order of mounting.

However, such conventional apparatus as described above have not necessarily been satisfactory for use in a production process on account of the following drawbacks: Namely, 1. Since the former is capable of mounting only one kind of electric part, the apparatus must be provided in a number corresponding to the number of kinds of electric parts to be handled, which not only add to the facility cost but also require a large floorspace.

2. In the latter, when a failure occurs in mounting one electric part in a series of automatic operation, remounting of the same kind of electric part is impossible in the process of said automatic operation.

3. The latter calls for an expensive control apparatus for arranging the electric parts in the order of mounting prior to the mounting operation.

4. When either of the apparatus is used singly, it is impossible to mount a desired electric part at a desired time on a printed substrate.

5. Since the mounting direction is fixed in either apparatus, the apparatus must be provided each for each mounting direction when the mounting direction variable. This not only adds to the facility cost but also requires a large floorspace and large labor for the maintenance and inspection of the apparatus.

6. In either apparatus, the steps of chopping, shaping and inserting the leads of electric parts are carried out at the same place, so that disposal of the cut pieces of leads becomes necessary, adversely affecting the operation efficiency, and in some cases the cut pieces provide a cause of malfunction of the apparatus.

7. Either apparatus is expensive since a numeral control system is used for the positioning of a printed substrate.

8. Complete automatization of the mounting operation cannot be attained.

In order to obviate the above-described drawbacks of the conventional apparatus, according to the present invention a plurality of electric part storage drums are provided in one apparatus and each storage drum has a band of electric part wound thereon, which band consists of a large number of electric parts of the same kind taped together in equally spaced parallel relation to each other. Therefore, the apparatus according to the present invention is singly capable of mounting a number of types of electric parts equal to the number of storage drums provided therein. Further, in the present apparatus, cutters are provided each for each of the aforesaid storage drums. These cutters simultaneously serve as an electric part drawing mechanism and are individually operated in response a suitable electric signal in an electric part mounting operation, whereby a desired electric part is drawn from the corresponding storage drum and the leads of the electric part are cut into a desired length to set the electric part free from the band of said electric part. It will, therefore, be appreciated that the order in which the electric parts are drawn can optionally be altered by changing the electric signal. The electric part thus separated from the band is transferred into a head unit by a conveyor and compressed air, wherein said leads are shaped into a desired shape. The electric part having had the leads thus shaped in the head unit is mounted on a printed substrate. In this case, the head unit is rotated in response to a suitable electric signal to set the electric part in a desired direction relative to the printed substrate. The selection of the mounting position on the printed substrate, i.e. the positioning of the printed substrate, is effected in such a manner that the printed substrate is roughly set in a desired position under analogue control using a servomotor at first and then precise positioning of the printed substrate is effected by inserting a positioning pin into a prescribed hole of a template.

Therefore, the cost of the positioning device used in the present apparatus is as low as about one-tenth of that of the numerical control system employed in the conventional apparatus and further safety can be assured in mounting the electric part.

It is also to be noted that according to the present invention, mounting and demounting of printed substrates are performed completely automatically by holding a printed substrate on which electric parts have been mounted and a printed substrate on which electric parts have not been mounted, by chuck means. The device used for mounting and demounting operation is so designed as to be readily adjustable for handling a given size of printed substrate.

As may be understood from the foregoing description, the apparatus of this invention eliminates and drawbacks of the conventional one and enables the operation of mounting electric parts on a printed substrate to be carried out fully automatically, and moreover it is readily adaptable to a change in size of printed substrate and in pattern.

An object of the present invention is to provide an apparatus by which the operations of selectively picking up a desired electric part from a plurality of kinds of electric parts each having leads extending axially from the opposite ends thereof, shaping the leads into a desired shape and mounting the electric part on a printed substrate in a desired position, can be performed positively, quickly and fully automatically.

Another object of the present invention is to provide an apparatus of the character described above, in which a program board-type electric control circuit is used as the means for selectively picking up the desired electric part, and means is provided for operating an associated cutter for cutting the leads of the electric part in a desired length to isolate said electric part and delivering said electric part into a mounting head unit.

Still another object of the invention is to provide an apparatus of the character described above, which is provided with a mechanism for positively picking up the electric parts individually by cutting the leads thereof.

Still another object of the invention is to provide an apparatus of the character described above, which is provided with a mounting head unit including means for shaping the leads of the electric part and means for changing the position of the electric part into a vertical position and mounting said electric part on the printed substrate.

Still another object of the invention is to provide an apparatus of the character described above, in which said mounting head unit is provided with a mechanism for rotating a portion thereof so that the direction of mounting the electric part on the printed substrate may be changed freely.

Still another object of the invention is to provide an apparatus of the character described above, which is provided with means for automatically mounting the printed substrate in a predetermined position on a positioning table and demounting the same therefrom, using a chuck mechanism.

Still another object of the invention is to provide an apparatus of the character described above, in which said mounting and demounting means is so constructed that it is readily adjustable for handling a printed substrate of different size, without requiring any additional parts.

A further object of the invention is to provide an apparatus of the character described above, which is provided with simple means for positioning the printed substrate in a desired position precisely automatically, said means including a known analogue control mechanism by which the printed substrate is roughly positioned in said position and a stylus which is inserted into a prescribed hole of a fixed template to position said printed substrate in said position precisely.

An additional object of the present invention is to provide an apparatus of the character described above, in which said positioning means is provided with an anvil block to be disposed below the printed substrate in securing the electric part to said printed substrate, said anvil block being integral with the fixed template, so that the leads of the electric part are always bent on the underside of the printed substrate along the printed land.

Other objects, features and advantages of the present invention will become apparent from the following detailed description when taken in conjunction with the accompanying drawings, in which.

As an embodiment of the present invention, an apparatus will be described which is adapted for mounting such electric parts as resistors, capacitors and diodes, having axially extending leads, on a printing substrate having an electric circuit or circuits printed thereon.

Construction

Figure 1:
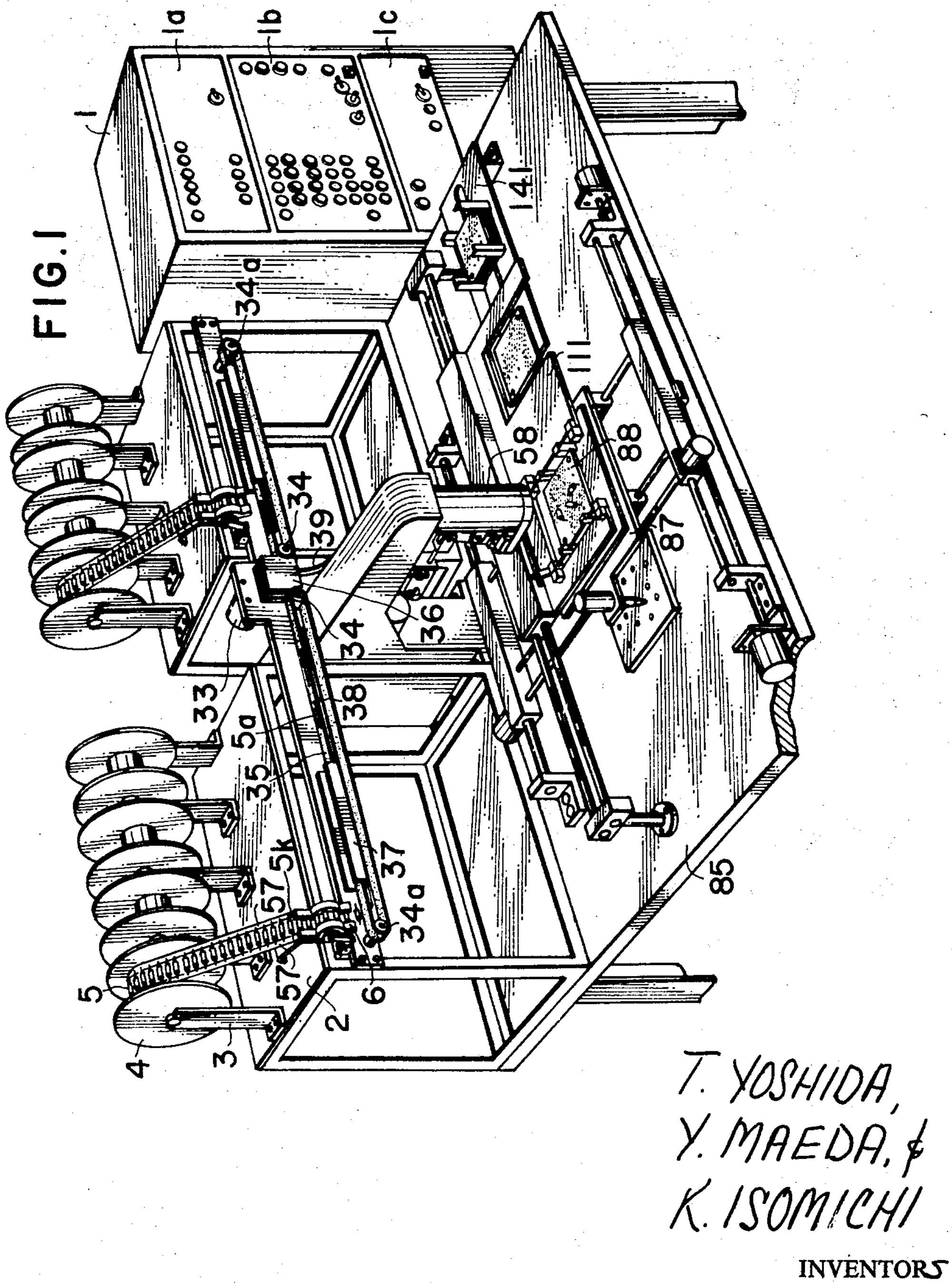
FIG. 1 is an overall perspective view of an embodiment of the full-automatic electric part mounting apparatus according to the present invention.

Referring to FIG. 1, reference numeral 1 designates an electric box, 1*a* a control box, 1*b* a program board and 1*c* a servoamplifier which is for the automatic positioning of a table to be described later. Operating units of the apparatus are operated by electromagnetic valves (not shown) which are actuated by a compressed air of 2 to 4 kg./cm.$^2$ according to a program set on the program board 1*b*.

Figure 2:
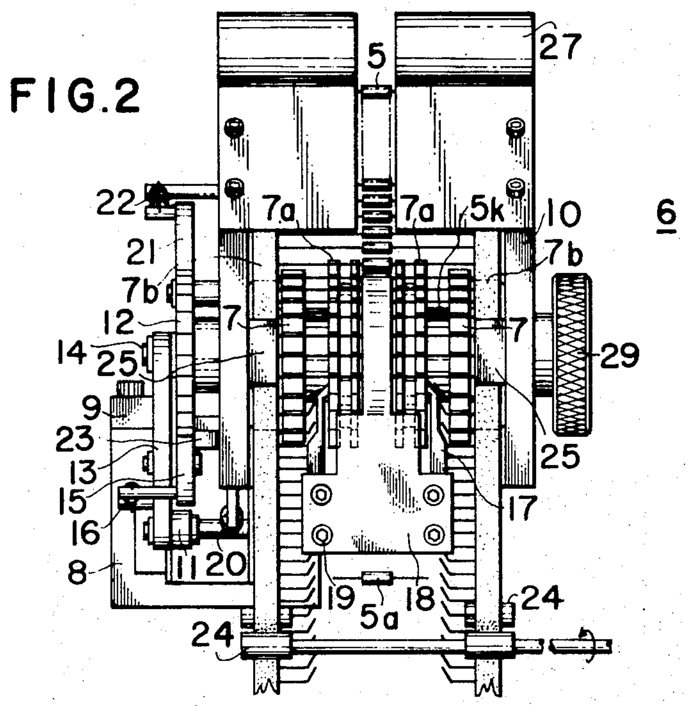
FIG. 2 is a front view of the cutter unit.
Figure 3:
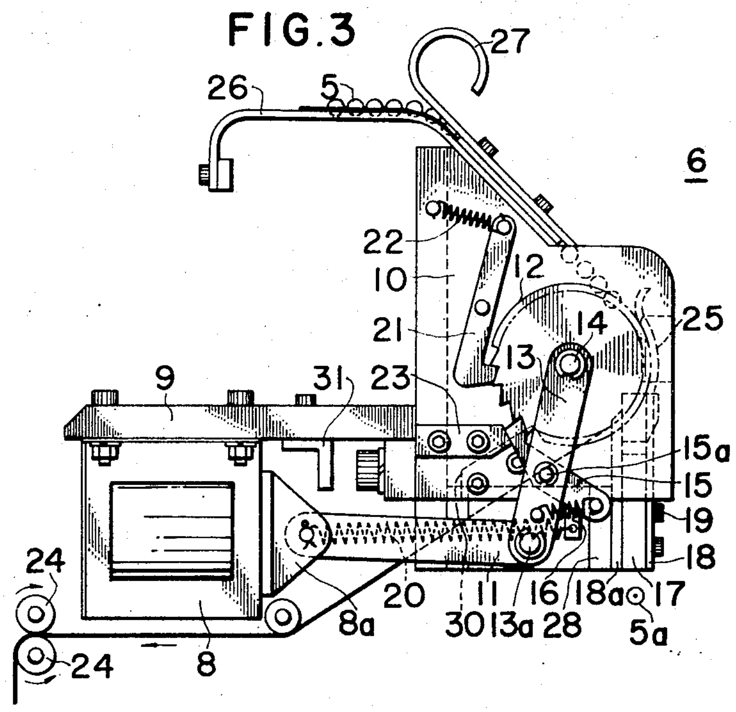
FIG. 3 is a side view of the cutter unit.
Figure 4:
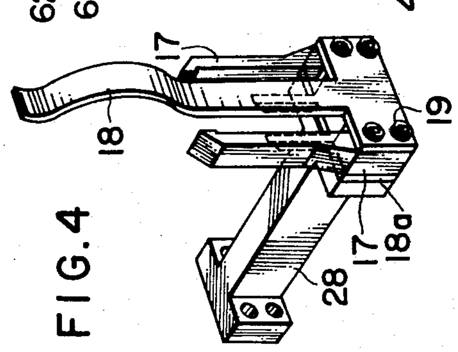
FIG. 4 is a perspective view showing the cutters and the guide of the cutter unit in assembly.

A frame structure 2 is fixedly mounted on a base plate 85 of the apparatus and a plurality of electric part storage drums 4 are rotatably supported on said frame structure 2 by means of spring plates 3 in such a manner that each individual storage drum 4 will not be rotated under inertia. At the top end extremity of each plate spring 3 is provided a resin-made part (not shown) for engagement with a supporting hole (not shown) formed in the associated storage drum 4, so that exchange of the storage drum 4 is facilitated and no damage is caused to the storage drum 4 during the exchanging operation. Each storage drum 4 has wound thereon a band of electric parts 5 of the same kind which are secured to a tape 57 in equally spaced relation to each other, and one end of the tape 57 extends into a cutter unit 6. Each electric part 5 has leads 5*k* extending axially outwardly from the opposite ends thereof and secured to the tape 57. In the cutter unit 6, the electric part 5 engages the teeth of feed gears 7 and cutter wheels 7*a*, which are fixedly mounted on a shaft 14 rotatably supported by a frame structure 10 of the cutter unit, as shown in FIGS. 2 and 3, said feed gears and said cutter wheels having the same number of teeth and being integral with each other. Reference numeral 8 designates a solenoid fixedly mounted on the frame structure 10 by means of a bracket 9, and a link 11 is pivotally connected at one end to a plunger 8*a* of said solenoid 8. To effect a return movement of the plunger 8*a* of the solenoid 8, a tension spring 20 is provided having one end anchored to the frame structure 10 and the other end to the outer end of said plunger 8*a*. A lever 13 has one end pivotally connected to the other of the link 11 by a pin 13*a* and the other end thereof is pivotally mounted on the shaft 14. A pawl member 15 is pivotally connected to an intermediate point of the lever 13 by means of a pivot pin 15*a*. This pawl member 15 is in meshing engagement with a ratchet 12 which is mounted on that portion of the shaft 14 which extends outwardly of the frame structure 10, and is fixed thereto by means of a key (not shown). Another pawl member 21 is held in engagement with the ratchet 12 under the biasing force of a spring 22, so as to hold said ratchet against reverse rotation. The pawl member 15 is biased in a clockwise direction by a spring 16. In order to enable the pawl member 15 to positively rotate the ratchet 12 one tooth on each movement of said pawl member, a stopper 23 is fixed on the frame structure 10. Cutters 17 are secured to a block 28 by bolts 19, together with guides 18, 18*a* and said block 28 is fixed to the frame structure 10. The cutters 17 are secured in contact with the outer faces of the respective cutter wheels 7*a* and the height thereof is adjusted by the bolts 19. The inner faces of the cutters 17 are respectively recessed as shown in FIG. 4. Reference numeral 25 designates tape guides, and 26, 27 designate other guides provided for facilitating the engagement of the taped band of electric parts 5 with the feed gears 7 and the cutter wheels 7*a*. Reference numeral 29 designates a manual operation handle and 30 designates guides secured to the frame structure 10, with the tip ends thereof in engagement with the cylindrical portions 7*b* of the respective feed gears 7 on which the tapes securing the electric parts 5 are trailed. The guides 30 serve to guide the cut pieces of the leads 5*k* of each electric part 5 towards delivery rolls 24 which are driven from an electric motor (not shown) provided rearwardly of the cutter unit 6. Reference numeral 31 designates a stopper by which the stroke of the plunger 8*a* of the solenoid 8 is adjusted. Reversing to FIG. 1 an electric motor 33 is operatively connected to belt pulleys 34 through gears (not shown) and loops of belt (not shown), and conveyor belts 35 are engaged around said belt pulleys 34 and driven pulleys 34*a* respectively for conveying the electric parts 5*a*, freed from the tapes 57 by having the leads cut, thereon to a hopper 36. The width of the conveyor belts 35 is made smaller than the length of the electric part 5*a*. Guides 37 are provided along the opposite edges of the conveyor belts 35 for guiding the electric parts 5*a* being carried on said conveyor belts. Below the upper length of the conveyor belt 35 is provided a support plate 38 to prevent vibration of said conveyor belt. A hose 39 is connected to the hopper 36 at one end and to an electric part receiving member in a head at the other end.

Figure 5:
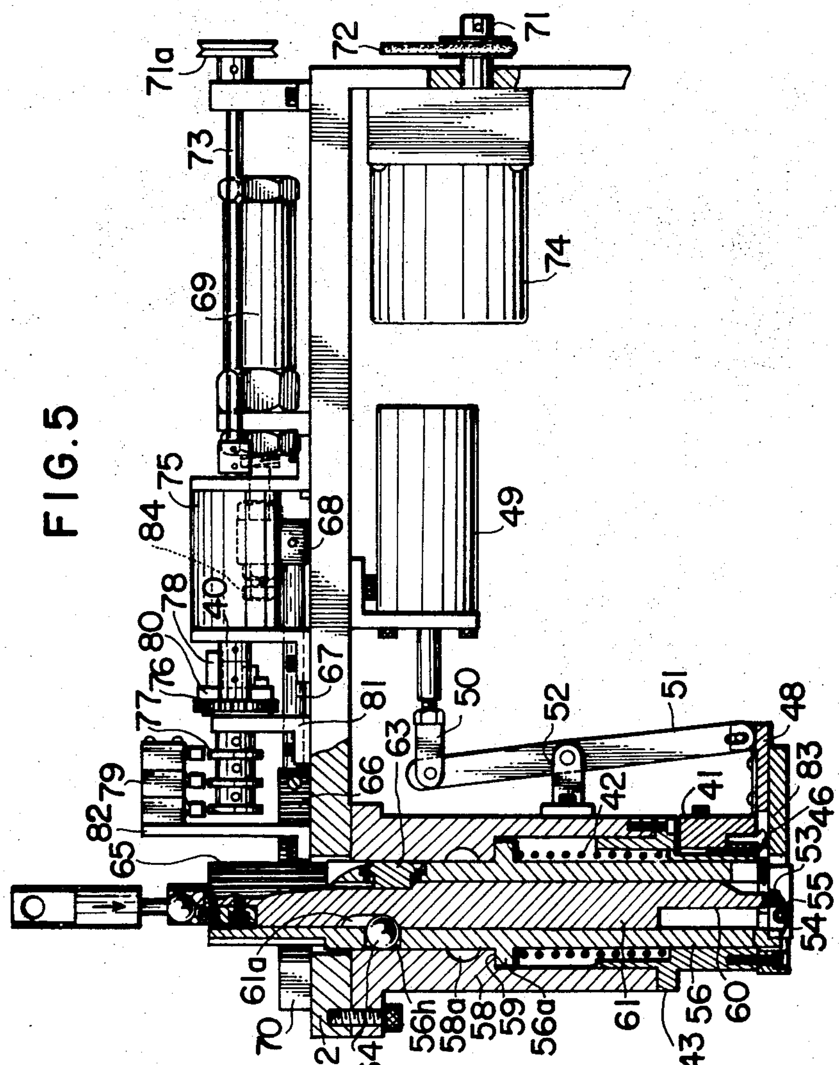
FIG. 5 is a side view of the heat unit.
Figures 6, 7, 8, 9:
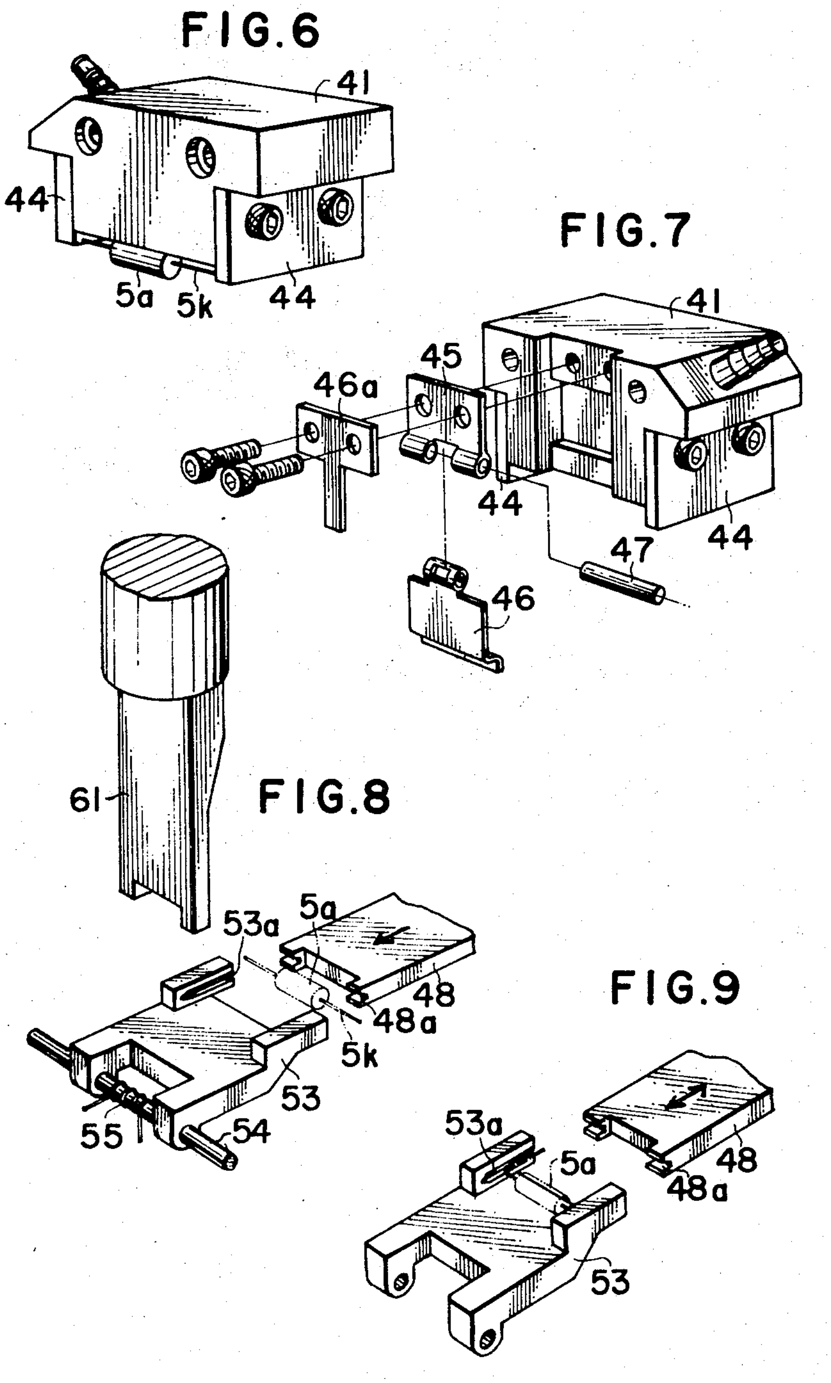
FIG. 6 is a perspective view of the electric part receiving member provided in the head unit.
FIG. 7 is an exploded perspective view of the electric part receiving member.
FIGS. 8 and 9 are perspective views of the essential portion of the heat unit.

Referring now to FIG. 5, reference numeral 41 designates the aforesaid electric part receiving member, details of which is shown in FIGS. 6 and 7. The electric part receiving member 41 is fixed to a stopper cylinder 43 for a spring 42 by means of bolts. In FIG. 7, reference numeral 44 designates transparent sideplates fixed to the electric part receiving member 41 by means of bolts, and 46 designates a regulating flap pivotally connected to a regulating plate 45 by a pin 47. The regulating plate 45 is secured to the electric part receiving member 41 by bolts, together with a plate spring **46*a*. The plate spring 46*a* biases the regulating plate 45 to hold in tight contact with the electric part receiving member 41. Below the electric part receiving member 41 is provided a guide 83**.

Reversing to FIG. 5, reference numeral 48 designates a shaping the having notches **48*a*, as shown in FIG. 9. The shaping die 48 and a member 50, connected to the outer end of a piston in a cylinder 49, are operatively connected with each other through a lever 51 which is pivotally connected to a fulcrum member 52. Reference numeral 56 designates a rotatable cylinder and at the lower end of said cylinder 56 is provided a die member 53 which is formed with V-grooves 53*a* and pivotable around a pin 54. The die member 53 is always held in horizontally parallel relation with the lower end 57 of the cylinder 56 by means of a spring 55. The cylinder 56 is surrounded by a head case 58 and a flange 56*a* formed thereon is always urged against a shoulder 59 at the top end of a spring receiving bore in said head case, under the biasing force of the spring 42. The head case 58 is fixed to the body 62 of the head by bolts. A sliding member 61 having a notch 60 formed at the lower end portion thereof is slidably mounted in the cylinder 56. The sliding member 61 is held against rotation relative to the cylinder 56, by a slide key 63 which is fixed to said cylinder 56 by a bolt. A steel ball 64 is provided to create a differential between the movements of the sliding member 61 and the cylinder 56. The cylinder 56 is formed with a hole 56*h* for mounting the steel ball 64 therein, whereas the head case 58 is formed with an annular groove 58*a* for receiving said steel ball, and the sliding member 61 is formed with a groove 61*a*. The top end of the cylinder 56 is provided with a pinion gear 65 which is in engagement with a rack 66. The rack 66 and a rod 67 are operatively connected to a cylinder 69 through a block 68. Reference numeral 70 designates a supporter for causing a sliding movement of the rack 66 in a horizontal direction, and 74 designates an electric motor. The drive of the motor 74 is transmitted from a V-pulley 71 to a driven pulley 71*a* through a belt 72 and then from a rod 73, on which said driven pulley 71*a* is fixedly mounted, to a shaft 40 through an electromagnetic clutch brake 75. Fixedly mounted on the shaft 40 are cams 77 and a gear 76. The gear 76 is in meshing engagement with a gear 80 which carries a plurality of stopper pin 78 of optional length thereon. The cams 77 are associated with a plurality of microswitches 79 to actuate the same. The gear 76, the cams 77 and the stopper-carrying gear 80 are supported on the body 62 of the head by means of a bracket 81, and the microswitches 79 are also securely mounted on the body 62 of the head by means of a bracket 82**.

Figure 12:
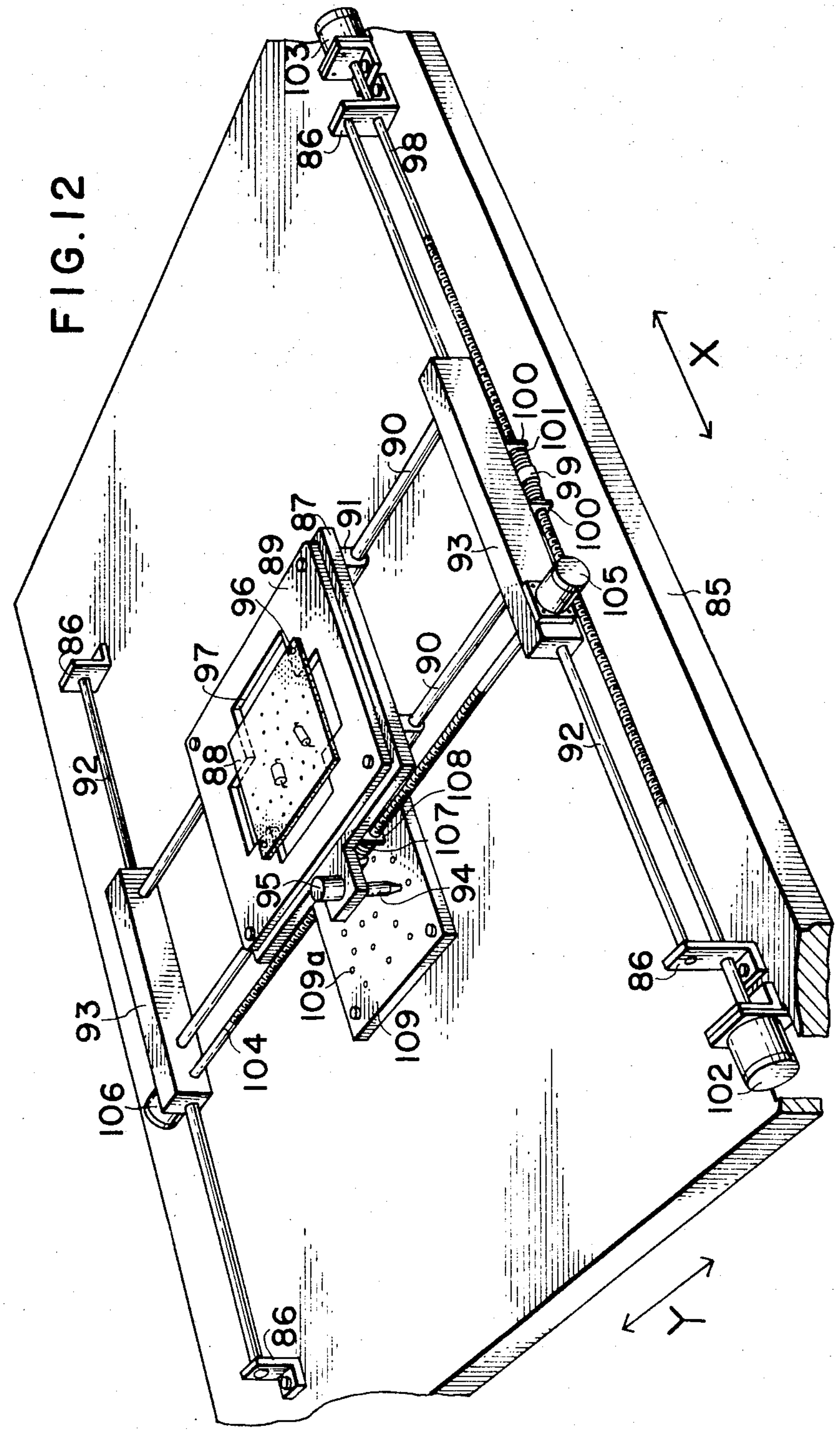
FIG. 12 is a perspective view of the positioning means of the apparatus.
Figure 15:
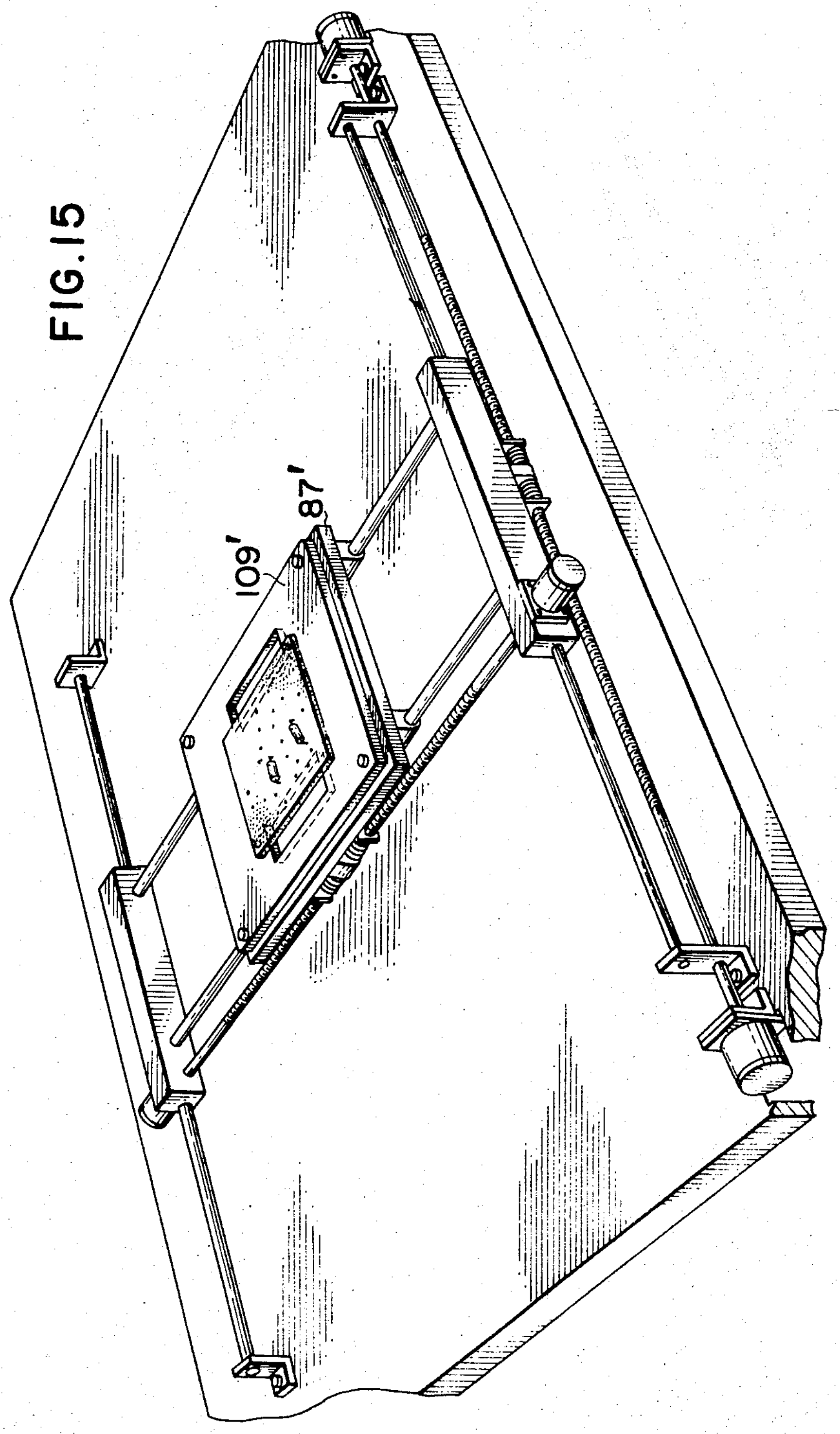
FIG. 15 is a perspective view of another type of the positioning means.
Figure 16:
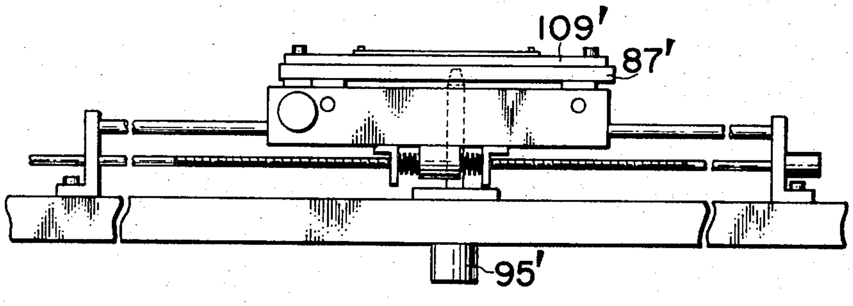
FIG. 16 is a front view of the essential portion of the positioning means shown in FIG. 15.
Figure 17:
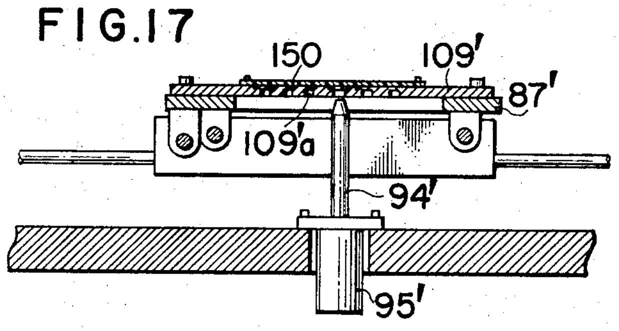
FIG. 17 is a sectional view through the center of the essential portion of the positioning means.
Figure 18A:
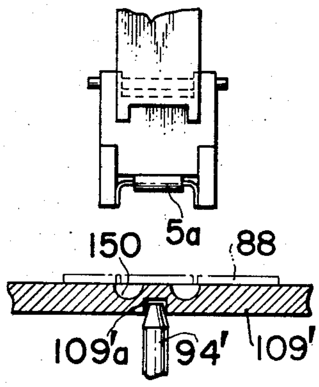
FIGS. 18A and 18B are views for explaining the operation of mounting an electric part using the positioning means respectively.
Figure 18B:
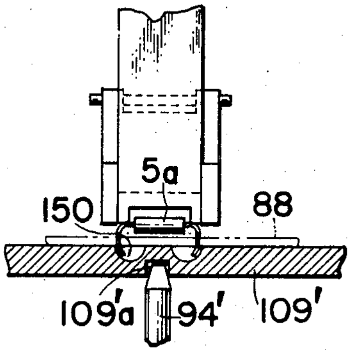
Figure 22:
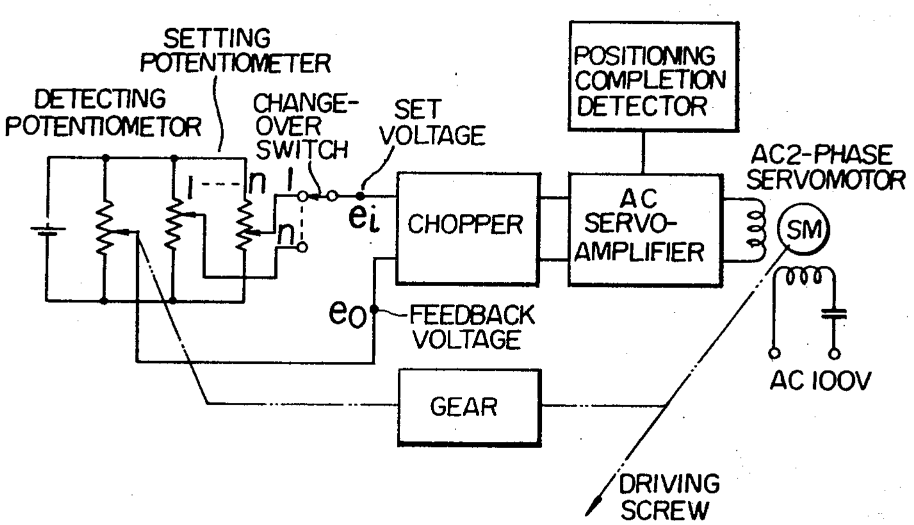
FIG. 22 is a block diagram of a positioning servomechanism.

Referring to FIG. 12, there is shown a positioning unit. In FIG. 12, reference numeral 86 designates brackets fixed on a base 85 by a bolt and 87 designates a table. On the table 87 is mounted a plate 89 having pins 96 for positioning a printed substrate 88 and a cross-shaped opening 97 in the center thereof, said plate 89 being fixed to said table 87 by bolts. The table 87 is slidably mounted on Y-axis rails 90 through slide bearings (not shown) accommodated in respective blocks 91. The Y-axis rails 90 are secured to rail blocks 93 at the opposite ends thereof which rail blocks are slidably mounted on X-axis rails 92 through slide bearings (not shown) accommodated in respective blocks 93. The X-axis rails 92 are securely supported by the aforesaid brackets 86. A cylinder 95 having a positioning taper pin 94 is mounted in the table 87. A threaded rod 98 is rotatably supported by the brackets 86, by which the table 87 is moved in the direction of X. A servomotor 102 to rotate the threaded rod 98 is operatively connected to one end of said rod while a position detecting potentiometer 103 is provided at the other end of said rod, said servomotor and said potentiometer being operated by an electric circuit shown in FIG. 22. A nut 99 is mounted on the threaded rod 98 in meshing engagement therewith. The nut 99 is in plane contact with the rail block 93 and retained by springs 101 and spring seats 100 fixed to the rail block 93. Therefore, the nut 99 is not rotatable on the threaded rod 98 but is only movable axially of said threaded rod. Likewise, a servomotor 105 and a position-detecting potentiometer 106 are mounted on a threaded rod 104 to cause a movement of the plate 87 in the direction of X, and a nut (not shown) is mounted on said threaded rod 104 in meshing engagement therewith, which is retained by springs 107 and spring seats 108 fixed to said table 87 in such a manner that it is not rotatable but is movable only in a horizontal direction. The threaded rods 98 and 104 each have a trapezoidal thread or ball thread.

A template 109 having precise positioning apertures **109*a* formed therein is provided below the positioning taper pin 94 and fixed on the base 85** by bolts.

Figure 19:
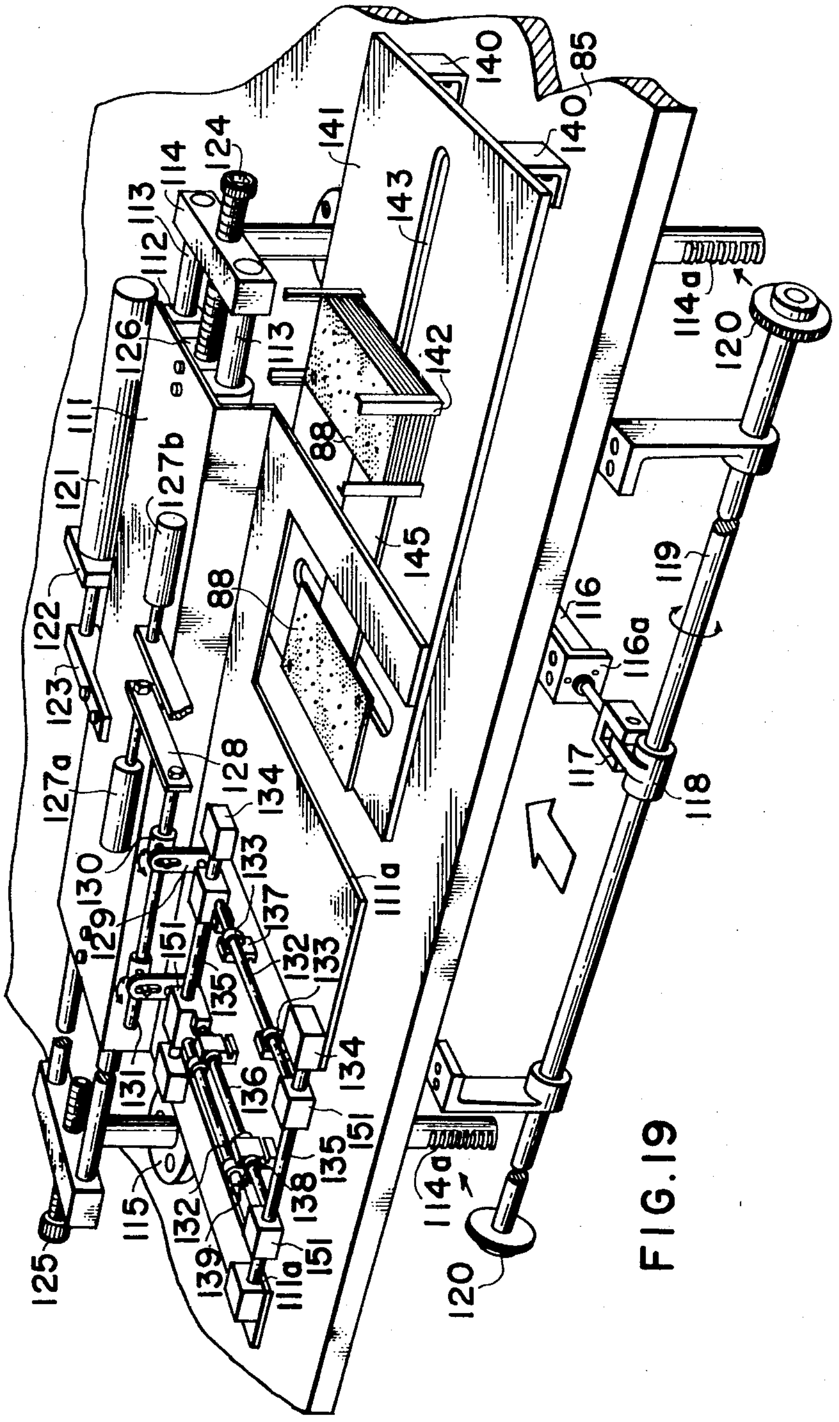
FIG. 19 is a perspective view of the printed substrate mounting and demounting means of the apparatus.

Referring to FIG. 19, there is shown a printed substrate mounting and demounting unit. A sliding plate 111 is slidably mounted on two rails 113 through a slide bearing (not shown) accommodated in each of blocks 112 secured to said sliding plate. A cylinder 121 is secured to the rails 113 to cause a sliding movement of the sliding plate 111 through a block 123. The opposite ends of the rails 113 are supported by rack-supporting posts 114 respectively. Each of the rack-supporting posts 114 is slidably supported by a cylinder 115 accommodating a slide bearing therein. The lower end **114*a* of each rack-supporting post 114 extends downwardly through the base 85 and is in meshing engagement with a gear 120 which is driven by a cylinder 116 fixedly mounted on the base 85 by means of a bracket 116*a*. Namely, the cylinder 116 causes a rotation of a rotary lever 118 and the rotation of said rotary lever is transmitted to the respective gears 120 through a connecting rod 119**.

Reference numerals 124, 125 designate set screws to adjust the terminal end of sliding movement of the sliding plate 111, and 126 designates a stopper. The sliding plate 111 has two notches **11*a* in each of which is provided chuck means operated by cylinders 127*a*, 127*b* (the chuck means in the right side notch being omitted). The cylinder 127*a* has a link plate 128 connected to the outer end thereof and said link plate has a rocking rod 131 connected thereto. The rocking rod 131 has rocking arms 129 mounted thereon and each rocking arm 129 has two rocking pins 130 fitted therein. A camshaft 132 is connected to each rocking arm 129 and a cam 133 is mounted on the camshaft 132. The camshaft 132 is rotatably supported by a sliding block 151**.

The sliding blocks 151 are slidably mounted on two fixed shafts 135 which in turn are fixed to blocks 134 securely mounted on the sliding plate 111. To each of the sliding blocks 151 is connected a finger shaft 134 on which two fingers 137, each having a groove **137*a*, are rotatably mounted. The position of each finger 137 is regulated by regulating discs 138 fixedly mounted on the finger shaft 136. Reference numeral 139 designates tension springs each provided between each finger 137 and the camshaft 132 and by which the finger 137 is held in engagement with the cam surface of the cam 133**. Four of such fingers constitute a chuck unit as a set.

Figure 20:
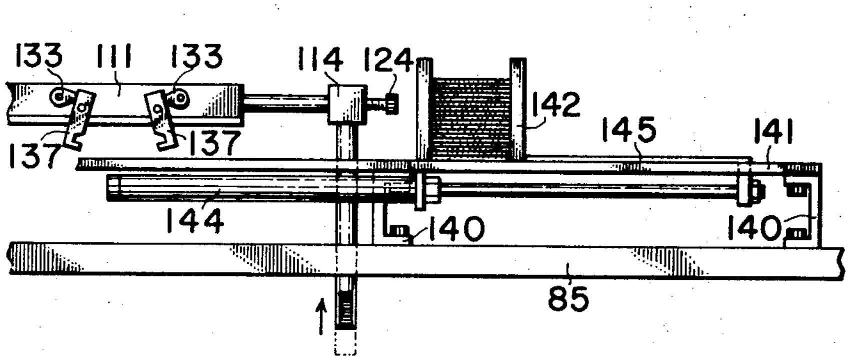
FIG. 20 is a front view of the printed substrate mounting and demounting means.

Further, as shown in FIGS. 19 and 20, a plate 141 is securely mounted on the base 85 through legs 140. The plate 141 has a slit 143 formed in the center thereof. A hopper 142 having a number of printed substrates 88 stored therein in juxtaposed relation is mounted on the plate 141. A thin runner 145 is provided on the plate 141 for sliding movement thereon along the slit 143, said runner being operated by a cylinder 144 mounted on the plate 141. The thickness of the runner 145 is made smaller than the thickness of the individual printed substrate 88.

Operation

The solenoid 8 of an optional cutter unit 6 is energized in response to a signal programmed on the program board 1*b* of the electric box 1, whereupon the plunger 8*a* is attracted against the biasing force of the spring 20. As a result, the link 11 connected to the solenoid 8 is operated and the lever 13, connected to the tip end of said link 11 by means of the pin 13*a*, is caused to make a pivotal movement around the shaft 14, whereby the ratchet 12, fixedly mounted on the shaft 14, is rotated one tooth by the pawl member 15 connected to said lever 13 by the pin 15*a*. Namely, the feed gears 7 and the cutter wheels 7*a*, coaxial with said ratchet 12, are rotated but only one tooth because the number of teeth thereof are the same. In this case, the operation of the pawl member 15 is restricted by the stopper 23, so that the ratchet 12, and the feed gears 7 and the cutter wheels 7*a*, will not be rotated two or more teeth under inertia. By the rotation of the feed gears 7 and the cutter wheels 7*a*, the band of electric parts 5, stored on the storage drum 4 and engaging said feed gears and said cutter wheels, is advanced. In this case, the band of electric parts 5 is fed positively since it is held taut by the guide 18. At the same time, the outer ends of the leads 5*k* of each electric part 5 are cut by the cutters 17 which are in engagement with the outer faces of the respective cutter wheels 17*a*. The electric part 5*a* having the leads thus cut drops between the guides 18 and 18*a*. The cutting position or the mounting position of the cutter 17 is located at an intermediate point between adjacent teeth of the cutter wheel 7*a* or at a ½-pitch phase, so that the cut electric part 5*a* is forcibly dropped only one-half pitch. When the cut electric part 5*a* has been forcibly dropped one-half pitch in the manner described, it is brought to the position of the recessed portions of the respective cutters 17 (see FIG. 4), so that the electric part 5*a* drops gravitationally. Concurrently with the lead-cutting operation, the taped band of electric parts 5 rotates the storage drum 4 on which it is wound, and the next electric part 5 is fed to the cutting position by the action of the feed gears 7. If, in this case, the storage drum 4 is rotated more than required under inertia, the taped band of electric part 5 would be slackened and the leads of the electric parts would possibly be deformed by being hooked by any projecting portion of the apparatus. In order to avoid such phenomenone, the storage drum 4 is held against such inertial movement by the plate spring 3. Upon completion of the cutting operation, the solenoid-energizing signal is interrupted, whereupon said solenoid is deenergized and the plunger 8*a* is returned to the position of the stopper 31 under the biasing force of the spring 20.

The electric part 5*a* thus cut out from the band of electric parts drops onto the conveyor belt, engaged around the pulleys 34, 34*a* and driven from the motor 33, and carried thereon to be dropped into the hopper 36, while being guided by the guide plates 37, and then dropped into the electric part receiving member 41, shown in FIGS. 5 to 7, through the hose 39. The electric part received in the receiving member 41 is laid stationarily on the guide mount 83 after the position thereof is regulated by the side plates 44 and the regulating plate 45 as shown in FIG. 6.

Such condition of the electric part 5*a* is detected electrically and a signal representative of such condition is given to an electromagnetic valve (not shown) provided below the base to energize the same, and thus the cylinder 49 is actuated. Consequently, the lever 51 is caused to make a pivotal movement about the fulcrum plate 52, causing a reciprocatory movement of the shaping die 48 on the guide mount 83. The shaping die 48 picks up the electric part 5*a* lying stationarily, by the notches 48*a* thereof and, after regulating the position, engages said electric part into the inside of the V-shaped grooves 53*a* of the cooperating die 53 against the regulating plate 46 being biased by the plate spring 46*a*. By this operation, the leads of the electric part 5*a* are flexed by the coaction of the notches 48*a* of the shaping die 48 and the V-shaped grooves 53*a* of the cooperating die 53 formed at the same level as said notches 48*a*. Upon completion of the shaping operation, the shaping die 48 is retracted and the electric part 5*a* thus shaped has the appearance as shown in FIG. 9. The electric part 5*a* is held in the V-shaped grooves 53*a* of the die 53 due to the springback of the flexed leads of said electric part.

In the process of the shaping operation described above, the following operation is performed: Namely, the cams 77 and the gear 76 are driven from a constantly rotating electric motor 74 through V-pulleys 71, 71*a*, a belt 72, a rod 73 and the electromagnetic clutch brake 75 and accordingly the stopper-carrying gear 80 is rotated which is in meshing engagement with and has the same number of teeth as the gear 76. The amount of rotation of the gear 80 is determined as follows: From the program board 1*b* of the electric box 1 shown in FIG. 1, a signal corresponding to a desired direction of insertion of the electric part 5*a* is emitted, whereby the corresponding one of a plurality of microswitches 79 is set in an operable position and simultaneously the electromagnetic clutch brake 75 is placed in an engaged position to rotate the cams 77. The gear 80 continues to rotate until the cam which is in engagement with said operable microswitch opens the contact of said microswitch. When the contact of said selected microswitch is opened by the cam, the electromagnetic clutch brake 75 is actuated and the gear 76 is disconnected from the motor 74, so that said gear 76 stops rotating. Accordingly, the cams 77 coaxial with the gear 76 and the gear engaging said gear 76 also stop rotating. Thus, that one of the stopper pins 78, carried on the gear 80, which is of length corresponding to the aforesaid desired direction of insertion, is located in a prescribed position.

Upon completion of the electric part shaping operation and the operation of positioning the particular stopper pin in said prescribed position, as described above, a signal representative of such condition is given to the electromagnetic valve (not shown) disposed below the base 85, to energize the same. As a result, the cylinder 69 is operated, and the block 68 connected to the end extremity of said cylinder 69 and the rack 66 connected to said block 68 through the rod 67 are caused to make a sliding movement on the body 62 of the head. The rack 66 continues its sliding movement until a stopper 84, screw threaded into the block 68, abuts against the stopper pin 78 which has been placed in the prescribed position in the manner described above. Therefore, the pinion gear 65 intermeshing with the rack 66 is rotated in the desired direction of insertion, along with the cylinder 56. Namely, the cylinder 56 is rotated in the desired direction of insertion. As the cylinder 56 is rotated, the die 53 connected to the lower end of said cylinder through the pin 54 and the slidable inserting rod 62 combined with said cylinder 56 through the slide key 63 are also rotated in the desired direction of insertion. In the manner described above, it is possible to rotate the electric part 5*a* in the desired direction of insertion by the reciprocatory movement of the cylinder 69.

Figure 10:
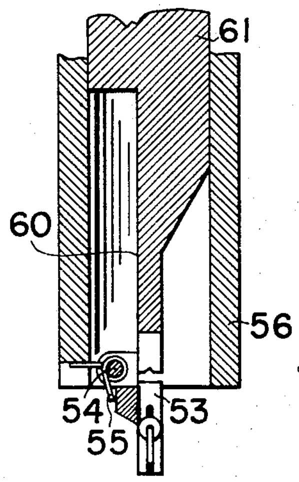
FIG 10 is a sectional view of the essential portion of the head unit.
Figure 11A:
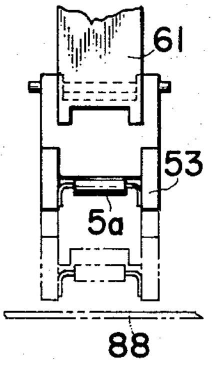
FIGS. 11A and 11B are views for explaining the operation of the head unit respectively.
Figure 11B:
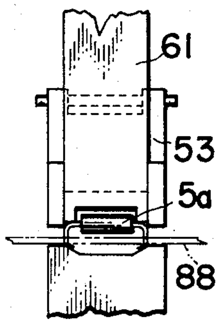
Figure 13:
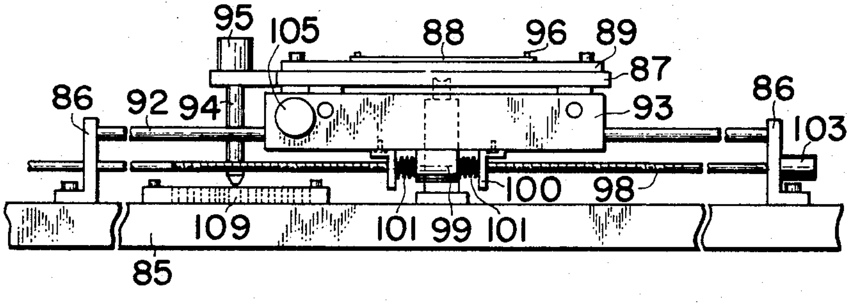
FIG. 13 is a front view of the essential portion of the positioning means.
Figure 14:
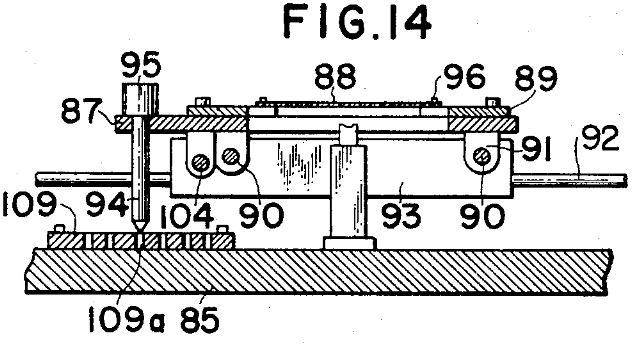
FIG. 14 is a sectional view through the center of the essential portion of the positioning means.

Then, the slidable inserting rod 61 is caused to make a vertical reciprocatory movement by a cylinder (not shown) provided at the top end thereof, in response to a signal which is issued with a slight delay with respect to the reciprocatory operation of the cylinder 69. First of all, the inserting rod 61 is moved downward by the action of the cylinder (not shown), whereupon said inserting rod only slides on the inner surface of the cylinder 61, while its rotating direction is regulated by the slide key 63 and the key groove, because the cylinder 56 is held in the position shown in FIG. 5 under the biasing force of the spring 42, and continues its downward sliding movement until the steel ball 64 abuts against the top end of the groove 61*a* formed in said inserting rod. In this state, the lower end of the inserting rod 61 abuts against the die 53 as shown in FIG. 10, causing the latter to pivot into a vertical position against the biasing force of a torsion spring 55. As the inserting rod 61 moves further downward, it pushes the steel ball 64 downward, which in turn pushes the cylinder 56 downward. Thus, the cylinder 56 is moved downward against the biasing force of the spring 42, until finally the flange 56*a* of said cylinder abuts against the top end of the stopper cylinder 43. The relative positions of the die 53, the electric part 5*a* retained by said die and the inserting rod 61, in this case, are as indicated by the dotted lines in FIG. 11A. The steel ball 61*a* being depressed by the top end of the groove 61*a* is received in the annular groove 58*a* formed in the head case 58, so that the inserting rod 61 is released from said steel ball 64 and thereafter the inserting rod 61 only moves downward to force the electric part 5*a*, retained in the V-shaped grooves 53 of the die 53, out of said die as shown in FIG. 11B, and the electric part 5*a* is mounted on a printed substrate 88, with its leads received in predetermined holes formed in said substrate. In this case, an anvil block (not shown), provided on the base 85 below the head has previously been brought into the corresponding position concurrently with and by the same operation as the operation of rotating the cylinder 56 in the desired direction of insertion described above, and is lifted to the underside of the printed substrate 88 at the same time when the leads of the electric part 5*a* are inserted into the predetermined holes on said printed substrate, whereby the leads of the electric part 5*a* are fastly secured to the printed substrate by being bent or caulked. The cylinder, upon completion of its downward movement against the baising force of the spring 42, is retained in its position by the engagement of the steel ball 54 into the annular groove 58*a* formed therein.

When the electric part 5*a* has been securely mounted on the printed substrate in the manner described, the inserting rod 61 is lifted and when the groove 61*a* is brought to a position corresponding to the annular groove 58*a*, the steel ball 64 is shifted into the groove 61*a* of the inserting rod 61, conversely to the case of downward movement of the inserting rod, since the cylinder 56 is constantly urged upwardly by the spring 42. Therefore, the cylinder 56 is disengaged from the head case 58 and moves upwardly along with the inserting rod 61 to its original position. Thus, a cycle of operation of the head unit is accomplished.

It is to be noted that the operation of the cutting unit is associated with the above-described operation of the head in such a manner that the operation of cutting an electric part 5*a* from the taped band of electric parts is effectuated by an electric signal, concurrently with the downward movement of the inserting rod 61, and the cut electric part 5*a* is transferred into the electric part receiving member 41 and laid stationarily in the prescribed position and in the desired direction as shown in FIG. 8, during the period in which the preceding electric part is mounted on the printed substrate 88 by the head unit.

Next, the printed substrate positioning unit will be explained with reference to FIGS. 12 to 14 and FIG. 22. When the above-described one cycle of operation of the head unit has been completed and one electric part 5*a* has been mounted on the printed substrate 88, the positioning table 87 is operated to locate the next insertion holes in said substrate in prescribed positions. The movement of the table 87 is effected by the servomotors 102, 105. The amounts of rotation of the servomotors 102, 105 are regulated by a voltage differential ($l_o$–$l_i$) between position setting potentiometers (not shown) for both the X and Y directions and the position detecting potentiometers 103, 106 for both the X and Y directions. Namely, when the servomotors 102, 105 for the X and Y directions are set in operation, the threaded rods 98, 104 for moving the table 87 in the X and Y directions respectively, which are directly connected to said respective servomotors, are rotated until the voltage differential ($l_o$–$l_i$) becomes zero. Therefore, the nut 99 mounted on the threaded rod 98 and a nut (not shown) mounted on the threaded rod 104 are displaced respectively, whereby the positioning table 87 is set in a predetermined position. In this case, however, precise positioning of the table 87 is impossible due to the instrumental error of the potentiometers, etc. For this reason, the cylinder 95 fixedly mounted on the positioning table 87 is operated in response to an electric signal signifying the fact that the aforesaid voltage differential ($l_o$–$l_i$) has become zero, whereupon a taper pin 94 is fitted into a precise positioning hole 109*a* formed in a template 109 which is fixed to the base 85 by means of bolts, and thus the table 87 is positioned precisely in a desired position. In the above-described operation, misalignment (error) of course occurs between the taper pin 94 at the end extremity of the cylinder 95, which has been positioned by the aforesaid servomechanism (see FIG. 22), and the precise positioning hole 109*a* in said template 109, due to the instrumental error of the potentiometers, etc. Such misalignment (error), however, can be corrected upon insertion of the pin 94 into the hole 109*a*. Further, the misalignment between the positioning table 87 and the threaded rods 98, 104, resulting from the above-mentioned misalignment (error), can be absorbed by the springs 101, 107 disposed between the nut 99 and the spring seats 100, 108 respectively.

Now, the printed substrate mounting and demounting unit will be described with reference to FIGS. 19 and 20. When a predetermined number of electric parts 5*a* have been mounted on one printed substrate 88 in the manner described above, the lowermost one of the printed substrates 88 stacked in the hopper 142 is delivered to below the notch 111*a* in the sliding plate 111, by being pushed by the runner 145. On the other hand, the cylinders 127*a*, 127*b* are actuated to rotate the camshafts 132 and the cams 133 through the link plate 128, the rocking rod 131, the rocking pins 130 and the rocking arms 129. Upon rotation of the cams 133, the fingers 137 in engagement with the respective cams 133 are rotated against the biasing force of the respective springs 139 and opened.

Figure 21:
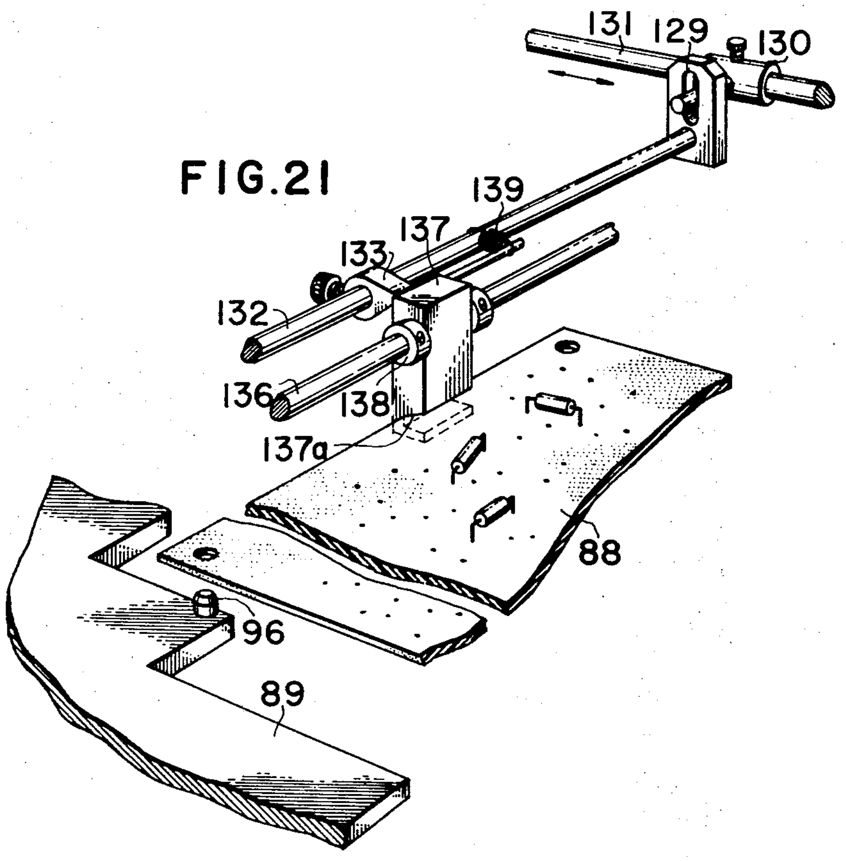
FIG. 21 is an enlarged perspective view of a portion of the printed substrate mounting and demounting means.

Then, the rack-supporting posts 114 are lowered by the action of the cylinder 116, provided on the underside of the base 85, through the rotary lever 118 and the gears 120. As a result, the sliding plate which is supported by the two rack-supporting posts 114 and the two rails 113 is lowered. In this case, the height of the grooves 137*a* formed in the respective fingers 137 are so selected as to equal to the height of the sliding plate 111 in its lowered position. Therefore, when the cylinders 127*a*, and 127*b* are reverted to their original position in response to an electric signal, the cams 133 are returned to the original positions and accordingly the respective fingers 137 are also returned to the vertical closed position. Thus, the printed substrate, on which electric parts have not been mounted, and the printed substrate, on which the electric parts have already been mounted, are gripped in the grooves 137*a* of the respective fingers of the right side chuck unit. Then, the posts 114 are elevated to the original positions by the reverse operation of the cylinder 116. In this case, the left side chuck unit removes the printed substrate 88 from the printed substrate regulating pins 96 on the printed substrate regulating plate 89 mounted on the positioning table 87 (see FIG. 21). Thereafter, the sliding plate 111 is caused to slide on the rails 113 by the action of the cylinder 121 and thereby the right side chuck is displaced to a position where the left side chuck was previously located. The rack-supporting posts 114 are lowered again to engage the new printed substrate, retained by the right side chuck, with the regulating pins 96. The preceding printed substrate (with the electric parts mounted thereon) retained by the left side chuck is delivered to the next station on a conveyor belt. The fingers 137 are again opened under such condition, by the action of the cylinders 127*a*, 127*b*, whereby the respective printed substrates are released from the fingers 137.

Then, the cylinder 116 is set in operation in response to a signal from a timer, etc., and both the left and right side chuck units are elevated to their original position, with the fingers thereof being opened. Upon completion of the elevation, the sliding plate 111 is returned to the original position by the action of the cylinder 121 in response to a signal signifying the completion of elevation of said chuck units. The cylinder 144 is also actuated in response to the same signal and a new printed substrate is delivered to the predetermined position from the hopper 142 by the runner 145 connected to said cylinder 144. Upon completion of such operation, a signal is given to the cylinder 144 to actuate the same and the runner 145 is returned to its original position by the action of said cylinder 144.

By the steps described above, one complete cycle of operation of the full-automatic electric part mounting apparatus according to the present invention has been completed.

Figure 23:
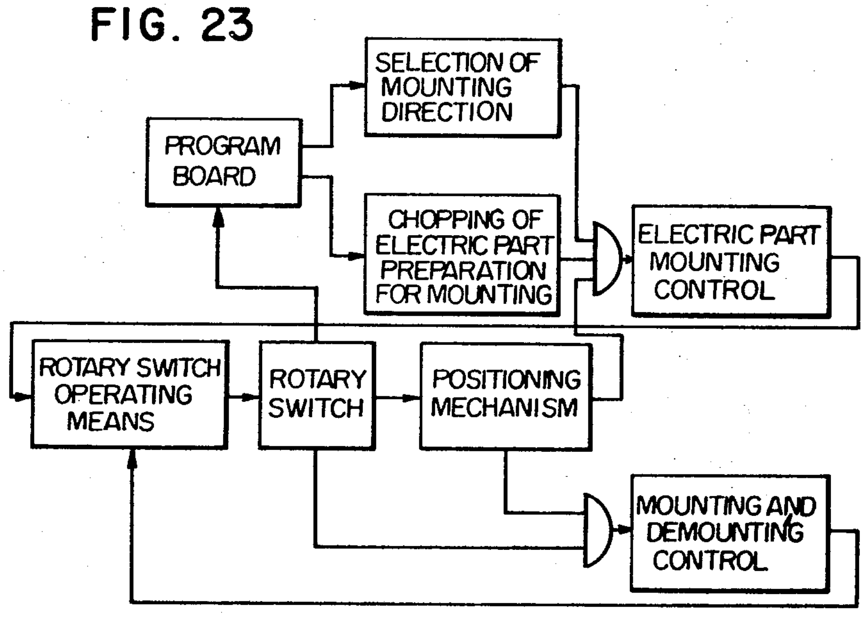
FIG. 23 is a block diagram showing the control circuit of the full-automatic electric part mounting apparatus of this invention.

The above-described operation of the apparatus of this invention will be briefly explained with reference to the diagram shown in FIG. 23. An electric part is cut out of the taped band of electric parts, transferred to the shaping position and shaped at said shaping position, in response to an electric signal issued from the program board of the electric box. Then, the mounting direction of the electric part is determined, whereupon another electric signal is issued. When the mounting position of the electric part has been determined by the positioning table, still another electric signal is issued. The electric part mounting operation is effected by the aforesaid three electric signals. Upon completion of the mounting, a signal is given to a rotary switch to actuate the same and the rotary switch is rotated to the next position. Then, a program corresponding to the new position of the rotary switch is supplied from the program board and the next cycle of electric part mounting operation takes place. When a predetermined number of electric parts have been mounted on one printed substrate by the cycle of operation described above, the rotary switch is shifted to the next position, whereupon a signal is issued to the mounting and demounting unit and the mounting and demounting operation takes place after said unit has been set in a predetermined mounting and demounting position. The rotary switch is shifted back to the original position upon completion of the mounting and demounting operation, and another cycle of electric part mounting operation is commenced. The above-described operation is repeated until a complete cycle of operation of the full-automatic electric part mounting apparatus is completed.

FIGS. 15 to 18 inclusive show another type of the precise positioning template. In this type, the mechanism for operating a positioning table 87' is the same as the servomechanism described herein with reference to FIGS. 12 and 22, and precise positioning is also effected by a taper pin and a precise positioning hole. However, the mechanism shown is capable of performing the other action which cannot be attained by the mechanism shown in FIG. 12. Namely, a cylinder 95' having a taper pin 94' connected to the end extremity thereof is provided below the head of the base, instead of the anvil block (not shown) which is used in the preceding embodiment for bending or caulking the lead ends on the underside of the printed substrate, and further the template 109 having the precise positioning hole **109*a* as shown in FIG. 12 is removed and instead a positioning plate 109' having precise positioning holes 109*a'* formed in the undersurface thereof is mounted on the positioning table 87'. In the top surface of the positioning plate 109' are formed V-shaped grooves 150 for bending the lead ends of an electric part in mounting said electric part on the printed substrate. By changing the direction of said V-shaped groove, the ends of the leads can be bent along a land of the printed substrate 88**.

What I claim is:

1. A full-automatic electric part mounting apparatus, comprising a band of a large number of electric parts having axially extending leads respectively and combined with each other in parallel side-by-side relation by means of tapes securing the outer ends of said leads, a storage drum having said band of electric parts wound thereon, a cutter unit adapted to cut the outer end portions of the leads of the electric parts while drawing said electric parts one after another and deliver the cut electric parts individually, a head unit adapted to bend the leads of each electric part delivered from said cutter unit and insert the bent leads of the electric part into holes formed in a printed substrate after changing the position of said electric part, a conveyor unit for transporting the individual electric parts from said cutter unit to said head unit, and means for accurately positioning said printed substrate in a predetermined position to provide for insertion of the leads of the electric part into said holes in the printed substrate.

2. A full-automatic electric part mounting apparatus as defined in claim 1, wherein said cutter unit comprises cutters for cutting the leads of each electric part in a predetermined length, feed gears for feeding the band of electric parts to said cutters and a mechanism for intermittently rotating said feed gear one tooth.

3. A full-automatic electric part mounting apparatus as defined in claim 1, wherein said conveyor unit comprises a constantly driven conveyor, an electric part receiving member for receiving each electric part cut free from the band of electric parts and holding the same in a predetermined position, and a hose connecting the terminal end of said conveyor with said electric part receiving member.

4. A full-automatic electric part mounting apparatus as defined in claim 1, wherein said head unit comprises a shaping die (53) having guide grooves (**53*a*) and pivotably and normally horizontally connected to the lower end of a cylinder (56) by means of a pin (54) and a spring (55), a cooperating shaping die (48) operated to make a reciprocatory movement relative to said shaping die (53) and thereby to engage the electric part held in the predetermined position by an electric part receiving member (41) into said guide grooves, and an inserting rod (61) axially slidably mounted in a cylinder (56) and adapted to swing said shaping die (53) into a vertical position against the biasing force of said spring (55**) and to depress the electric part to insert the leads of said electric part into holes in the printed substrate when moved downwardly.

5. A full-automatic electric part mounting apparatus as defined in claim 1, wherein said head unit comprises a cylinder (56) having a shaping die (53) pivotably horizontally connected to the lower end thereof, an inserting rod (61) axially slidably mounted in said cylinder (56) and adapted to swing said shaping die (53) into a vertical position and depress the electric part held in said shaping die to insert the leads of said electric part into holes in the printed substrate when moved downwardly, and a mechanism for rotating said cylinder (56) and said inserting rod (61) about their own axes.

6. A full-automatic electric part mounting apparatus as defined in claim 1, wherein said head unit comprises a cylinder (56) having a shaping die (53) pivotally horizontally connected to the lower end thereof, an inserting rod (61) axially slidably mounted in said cylinder (56) and adapted to swing said shaping die into a vertical position end depress the electric part held in said shaping die to insert the leads of said electric part into holes in the printed substrate when moved downwardly, a pinion (65) provided at the top end of said cylinder (56), a rack (66) intermeshing with said pinion (65), a stopper disc (80) having stopper pins (78) thereon for limiting the stroke of said rack (66), and means for controlling the rotation of said stopper disc.

7. A full-automatic electric part mounting apparatus as defined in claim 1, wherein said positioning means comprises a positioning table (87) for mounting the printed substrate (88) thereon, rails (90) for supporting said positioning table (87) for sliding movement thereon in one direction, rail blocks (93) for supporting said rails (90), rails (92) for supporting said rail blocks (93) for sliding movement thereon in a direction at right angles to said one direction, a threaded rod (104) extending parallel to said rails (90), a servomotor (105) for rotating said threaded rod (104), a potentiometer (106) for detecting the amount of rotation of said threaded rod (104), another threaded rod (98) extending parallel to said rails (92), another servomotor (102) for rotating said threaded rod (98), another potentiometer (103) for detecting the amount of rotation of said threaded rod (98), two spring seats (108) fixed to said positioning table (87) and having said threaded rod (104) extending therethrough, a nut disposed between said two spring seats (108) and threadably mounted on said threaded rod (104), springs (107) each mounted on said threaded rod (104) between said nut and one of said spring seats (108), two spring seats (100) fixed to one of said rail blocks (93) and having said threaded rod (98) extending therethrough, a nut 99 disposed between said two spring seats (100) and threadably mounted on said threaded rod (98), springs (101) each mounted on said threaded rod (98) between said nut (99) and one of said spring seats (100), a taper pin (94) supported by said positioning table (87) and adapted to make a vertical movement, and a template (109) having a large number of positioning holes (109*a*) formed therein for engagement with the lower end of said taper pin (94).

8. A full-automatic electric part mounting apparatus as defined in claim 1, wherein said positioning means comprises a positioning table (87') for mounting the printed substrate (88) thereon, rails (90) for supporting said positioning table (87') for sliding movement thereon in one direction, rail blocks (93) for supporting said rails (90), rails (92) for supporting said rail blocks (93) for sliding movement thereon in a direction at right angles to said one direction, a threaded rod (104) extending parallel to said rails (90), a servomotor (105) for rotating said threaded rod (104), a potentiometer (106) for detecting the amount of rotation of said threaded rod (104), another threaded (98) extending parallel to said rails (92), another servomotor (102) for rotating said threaded rod (98), another potentiometer (103) for detecting the amount of rotation of said threaded rod (98), two spring seats (108) fixed to said positioning table (87') and having said threaded rod (104) extending therethrough, a nut disposed between said two spring seats (108) and threadably mounted on said threaded rod (104), springs (107) each mounted on said threaded rod (104) between said nut and one of said spring seats (108), two spring seats (100) fixed to one of said rail blocks (93) and having said threaded rod (98) extending therethrough, a nut (99) disposed between said two spring seat (100) and threadably mounted on said threaded rod (98), springs (101) each mounted on said threaded rod (98) between said nut (99) and one of said spring seats (100), a positioning taper pin (94') and an anvil block provided below said printed substrate (88) and having a large number of positioning holes (109*a'*) formed in the undersurface thereof for engagement with the lower end of said taper pin (94').